United States Patent [19]

Weinmann

[11] 3,984,891
[45] Oct. 12, 1976

[54] PORTABLE RAMP

[75] Inventor: Carl E. Weinmann, Lake City, Minn.

[73] Assignee: Valley Craft Products, Inc., Lake City, Minn.

[22] Filed: Nov. 12, 1974

[21] Appl. No.: 518,726

[52] U.S. Cl. .................................................. 14/69.5
[51] Int. Cl.² ................................................ E01D 15/12
[58] Field of Search ................. 14/71, 72; 52/588; 404/41

[56] References Cited
UNITED STATES PATENTS

| | | | |
|---|---|---|---|
| 2,089,380 | 8/1937 | Kammerer | 52/758 D X |
| 3,100,556 | 8/1963 | DeRidder | 52/588 |
| 3,307,719 | 3/1967 | Martin | 14/71 X |
| 3,385,182 | 5/1968 | Harvey | 52/588 X |
| 3,424,323 | 1/1969 | Barnaby | 14/71 X |
| 3,516,560 | 6/1970 | Brighton | 14/71 X |
| 3,735,440 | 5/1973 | Hetmanski | 14/71 |
| 3,742,911 | 7/1973 | Lehe | 52/588 X |
| 3,795,333 | 3/1974 | Tebben | 14/71 X |

FOREIGN PATENTS OR APPLICATIONS

| | | | |
|---|---|---|---|
| 1,038,445 | 8/1966 | United Kingdom | 14/72 R |

*Primary Examiner*—Nile C. Byers, Jr.
*Attorney, Agent, or Firm*—Hill, Gross, Simpson, Van Santen, Steadman, Chiara & Simpson

[57] ABSTRACT

A portable ramp includes a span to the ends of which are secured feet, such securement being by means of pivotal connections that enable the feet to be pivoted so as to accommodate various differences in heights between two surfaces, from one to the other of which there is to be a movement such as of a wheeled vehicle.

8 Claims, 7 Drawing Figures

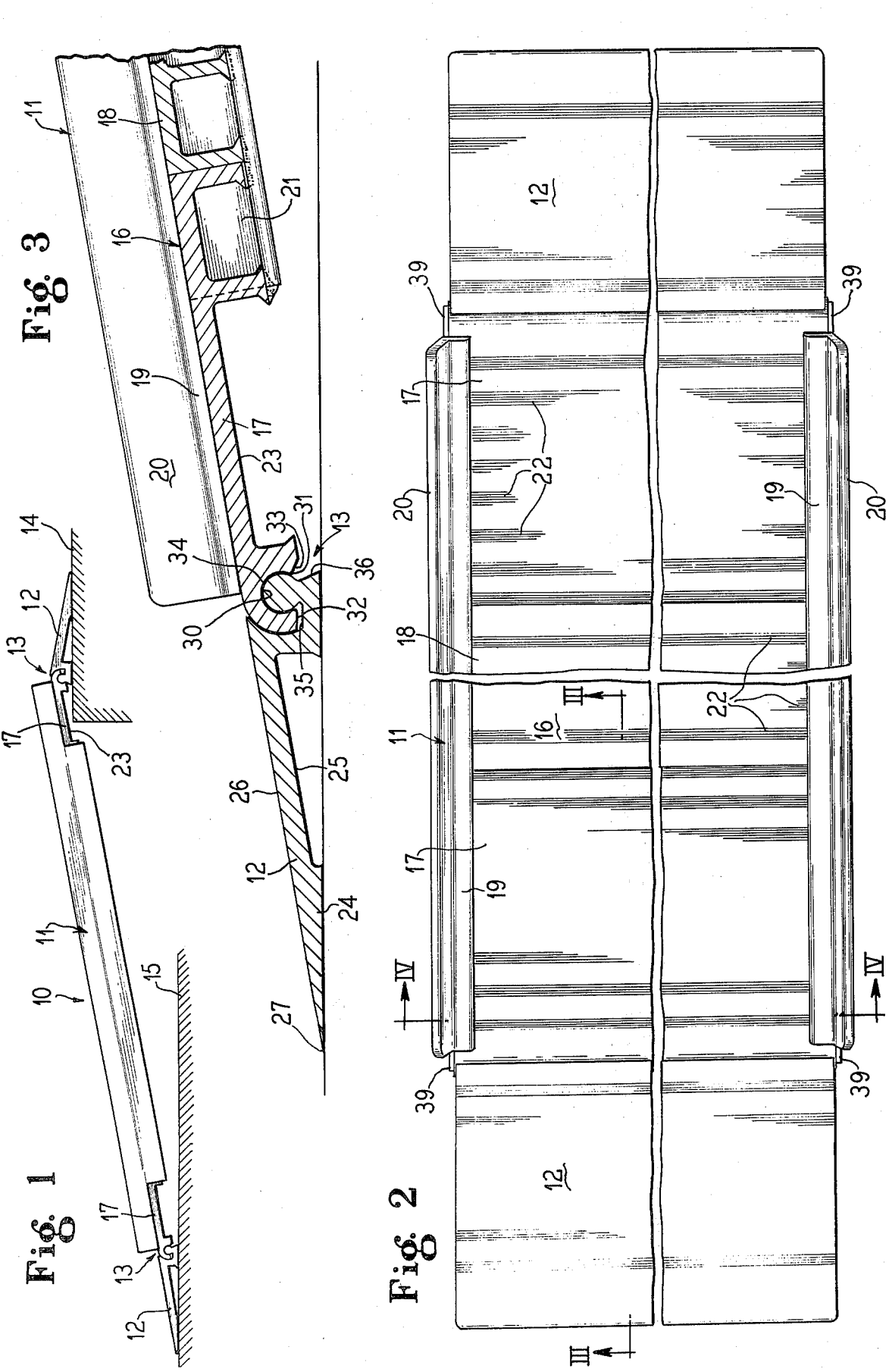

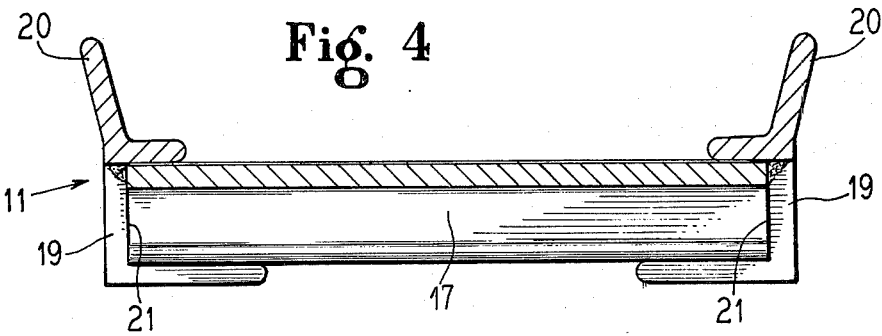
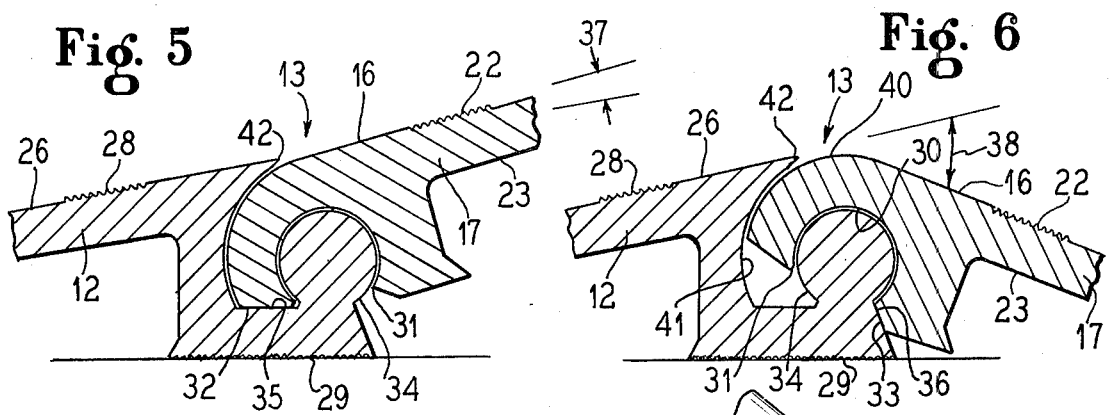
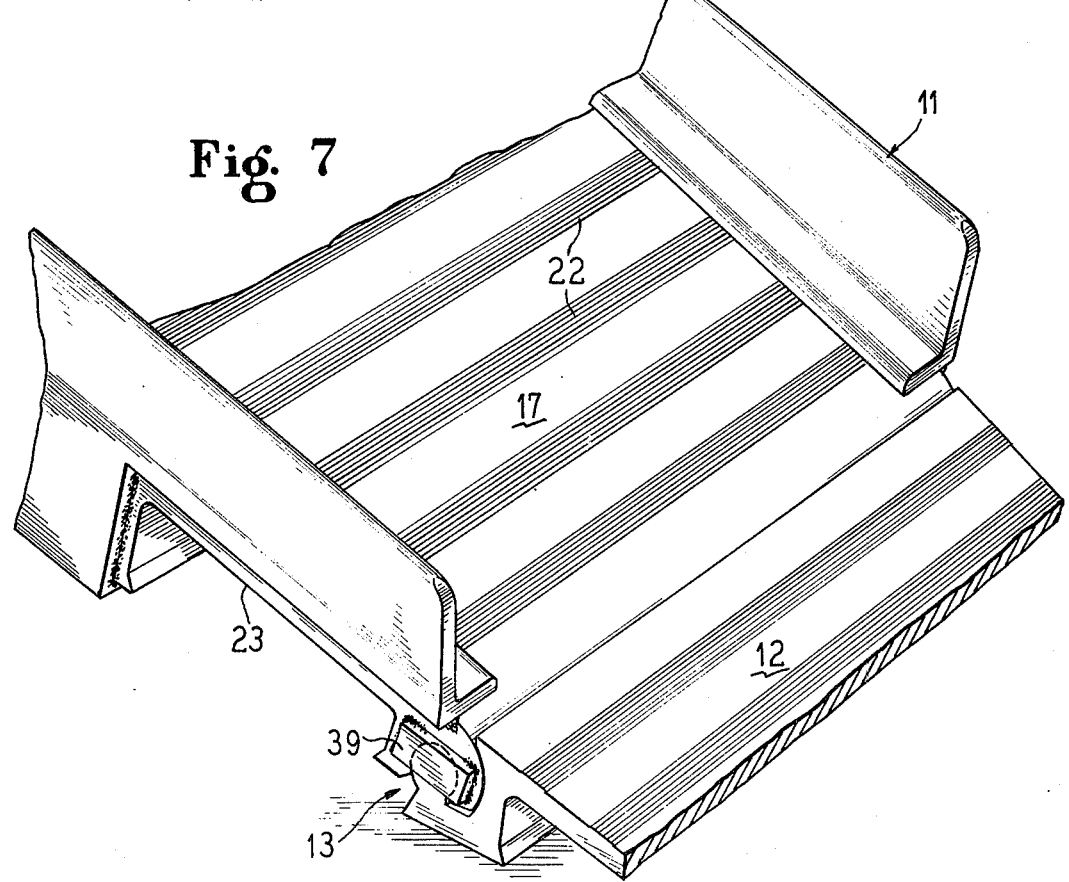

PORTABLE RAMP

BACKGROUND OF THE INVENTION

This invention pertains to a portable ramp.

PRIOR ART

Heretofore, it has been customary for users of or customers for portable ramps to specify the difference in height between the surfaces that the ramp is to be used. Ordinarily, the ends of such ramps comprised a portion rigidly secured to the main span at an angle. By so doing, the amount of bump that a vehicle such as a hand cart or dolly is subjected to is minimized. The amount of impact that is given to the load is thus minimized. However, as a practical matter, every such portable ramp had to be constructed specially for a specific difference in height, and as the actual height in use varied from the design height, bumping and jarring of loads progressively increased. This factor also made it hard to get a vehicle started on a ramp at either the top or the bottom.

To further complicate use of such prior art device, when one of the support surfaces constituted a truck bed, owing to the spring-support of such bed, the actual difference in height would progressively vary as the truck was loaded or unloaded.

SUMMARY OF THE INVENTION

The present invention is directed to a portable ramp which includes a main span to which there are pivotally connected a pair of feet at the ends thereof which in effect level out or fill in any bump at the span ends.

Accordingly, it is an object of the present invention to provide a portable ramp that can be used between two surfaces that have a height difference that represents a range of heights.

Another object of the present invention is to provide a portable ramp onto which a wheeled vehicle can be rolled without there being a significant bump to the vehicle as the vehicle rolls onto or rolls off the ramp.

A still further object of the present invention is to provide a construction for a portable ramp that can be constructed in a wide range of widths and in a wide range of lengths without making any tooling change.

Many other advantages, features and additional objects of the present invention will become manifest to those versed in the art upon making reference to the detailed description and the accompanying sheets of drawings in which a preferred structural embodiment incorporating the principles of the present invention is shown by way of illustrative example.

ON THE DRAWINGS:

FIG. 1 is a side elevational view of a portable ramp provided in accordance with the principles of the present invention, the ramp resting on two vertically spaced support surfaces;

FIG. 2 is an enlarged plan view of the ramp shown in FIG. 1;

FIG. 3 is an enlarged cross-sectional view of a fragmentary portion of the ramp taken along line III—III of FIG. 2;

FIG. 4 is an enlarged cross-sectional view taken along line IV—IV of FIG. 2;

FIGS. 5 and 6 are enlarged cross-sectional views of a portion of FIG. 3 showing the range of pivoting for this particular configuration; and FIG. 7 is a fragmentary enlarged perspective view, partially broken away, of the structure illustrated in FIG. 3.

AS SHOWN ON THE DRAWINGS:

The principles of the present invention are particularly useful when embodied in a portable ramp such as illustrated in FIG. 1, indicated generally by the numeral 10. The portable ramp 10 includes a span 11 to which a pair of feet 12 are secured by a pair of pivotal connections 13, the feet 12, 12 being shown resting on an upper surface 14 and a lower surface 15. The upper surface 14 may be a dock and the lower surface 15 may be the ground so that the space in between is an extension of the surface 15. On the other hand, the surfaces 14 and 15 can represent two vehicles with a space therebetween.

The span 11 has an upper side 16 which is provided by the upper side of a pair of end members 17 and a number of filler members 18 disposed therebetween. The end members 17 and filler members 18 are secured to a pair of spaced parallel side rails 19, 19, each of which has an elongated flange 20 which projects upwardly.

As best seen in FIG. 4, each of the spaced parallel side rails 19 has a C-shaped portion 21 which opens toward the C-shaped portion 21 of the other side rail 19. The height of each of the end members 17 and filler members 18 is such that they fit snugly into such C-shaped portions at opposite sides of the span 11. Preferably, the side rails 19 comprise aluminum extrusions, the C-shaped portion 21 at each end of each side rail 19 having been removed as best seen in FIG. 7 for a purpose explained below. As a practical matter, the length of the side rails 19, 19 is chosen in accordance with the length of portable ramp needed, and such length is presently limited only by the present limits of length of extrusion, namely about 20 ft.

Each end member 17 fits into the C-shaped portions 21 of the side rails 19 as shown in FIG. 4, and have a transverse cross-sectional configuration as shown in FIG. 3. As the cross-sectional configuration is uniform, the end members 17 also preferably comprise an aluminum extrusion as do the filler members 18, and these extrusions are cut to lengths in accordance with the requirement for the width of the span 11. The upper side 16 of the span 11 is provided with anti-skid means 22 as best seen in FIGS. 5 and 6 but also shown in FIGS. 2 and 7. The anti-skid means 22 is thus formed integrally with the end members 17 and the filler members 18 as they are extruded.

The lower side of each member 17 is recessed as shown at 23 in FIG. 3, and the C-shaped portion 21 of each side rail 19 is cut away adjacent to the recess 23 so as to provide transverse clearance between the ends of the C-shaped portions 21 of the side rails 19 and a pivotal connection 13. The purpose for such recess 23 is illustrated in FIG. 1 in which the edge of the surface 14 that supports the foot 12 is thus provided with clearance with respect to the end member 17, thus making the placement of the foot 12 not particularly critical.

As best seen in FIG. 3, each foot 12 has a lower side 24 for engaging the surface 15, a portion 25 of which is omitted to save material and to lessen weight. The foot 12 has a sloping upper side 26 which extends between the upper side 16 of the span 11 and the surface 15 or 14. The lower side 24 and the upper side 26 converge to an edge 27 and which diverge at the other end of the foot 12 by an amount which is essentially equal to he thickness of the span 10 at its upper side 16. A number of anti-skid means 28 are provided on the upper side 26 (FIGS. 5 and 6) and other anti-skid means 29 are provided on the lower surface 24 beneath the pivotal connection 13. Each foot 12 supports one end of the span 11 through the associated pivotal connection 13. Each foot 12 is also preferably an aluminum extrusion and has a width corresponding to that of the end and filler members 17, 18.

Each pivotal connection 13 is a special type of ball and socket joint shown here with the "ball" carried on the foot 12 and the "socket" carried on the end member 23. The elements about to be described can be reversed so that the "socket" is on the foot 12 and the "ball" is on the end member 17.

As shown, each pivotal connection 13 includes a first means 30 which comprises a female cylindrical surface that has an angular extent about its axis exceeding 180 degrees, and this cylindrical surface section extends between opposite sides of a rectangular slot 31 narrower than the diameter of the cylindrical surface 30. The surface 30 is connected to the foot or end member, here the end member 17, and in fact is integral with the same so that such portion of the pivotal connection is produced in the extrusion of the end member 17. A pair of stop surfaces 32, 33 extend transversely to the cylindrical surface formation from edges of such female cylindrical surface 30. Second means 34 define a male cylindrical surface or surface section which has an angular extent about its axis which is greater than that of the cylindrical surface 30 but which is under 360°, the cylindrical surface 34 being received within the cylindrical surface 30. The cylindrical surface 34 is connected to the other foot or end member, and in this embodiment to the foot 12, being integral therewith and thus produced as a consequence of the extrusion of the material from which the foot 12 was cut. Adjacent to the male cylindrical surface 34, there are provided two stop surfaces 35, 36 which project from the edges of the male cylindrical surface or surface section 34. The stop surfaces 35, 36 are respectively engageable with the stop surfaces 32, 33 to limit the angle of pivoting between each foot 12 and the span 11.

Such limiting is better shown in FIGS. 5 and 6. In FIG. 5, the stop surface 32 has come into engagement with the stop surface 35, and the angle 37 thus indicates the amount that the foot 12 can be pivoted toward one side of the upper side 16. In FIG. 6, the stop surface 33 engages the stop surface 36 and thus limits the angle which the foot 12 can be pivoted in the opposite direction to the other side of the upper side 16 by an amount indicated by the angle 38.

FIGS. 5 and 6 also in life size (in the original patent drawing) illustrate the liberal clearances that are provided between the complementally shaped surfaces of the pivotal connection 13, which may be on the order of 1 millimeter as shown in FIG. 6 so that any dirt that gets into the pivotal connection 13 can easily fall out or be flushed out.

To retain the means 30, 34 in axially assembled relation, a pair of abutments 39, 39 are secured adjacent to each end of one of the means 30, 34 to thereby trap the other means. In the preferred embodiment listed, each abutment 39 is secured to the end member 17 in spanning relation to the female cylindrical surface 30 which thus not only prevents disengagement of the pivotal connection 13, but also tends to keep the slot 31 from spreading.

Each end member 17 has an arcuate surface 40 which is convex and concentric with its cylindrical surface 30, and each foot 12 has a concave cylindrical surface 41 which is concentric with the male cylindrical surface 34 (FIG. 6), the convex surface 41 leading to an upper edge 42 which, for all possible angular positions, is spaced a uniform distance from the surface 40 to make the transition from the upper side 26 of the foot 12 to the upper side 16 of the end member 17 of the span 11 always smooth, and whatever little bump there is, it is negligible and constant even though the height between the surfaces 14 and 15 may vary a good deal.

As shown in FIG. 6, the upper side 16 of the end member 17 merges into the cylindrical surface 40 which is concentric with the pivotal axis of the pivotal connection 13, the upper side 26 of the foot 12 extending essentially tangentially to the cylindrical surface 40 and terminating in the edge 42 which is as close to the surface 40 as the clearances mentioned will permit.

With the structure of this embodiment, the pivotal connections 13 thus connect the feet 12 to opposite ends of the span 11 and the span 11 is supported through the pivotal connections 13 and the feet 12 on the surfaces 14, 15. The arrangement of stops enables the sloping side of each foot to pivot to either side of the plane of the upper side 16 of the span.

The end members 17 and the filler members 18 are joined by heliarc welding to the side rails 19 along areas of proximity or close to areas of contact to render the span 11 as one unified rigid element. For larger sizes of portable ramp 10, handles (not shown) may be secured to the outside of the side rails 19 to facilitate movement and placement thereof.

Although various minor modifications might be suggested by those versed in the art, it should be understood that I wish to embody within the scope of the patent warranted hereon, all such embodiments as reasonably and properly come within the scope of my contribution to the art.

I claim as my invention:

1. A portable ramp for spanning a space between two surfaces, comprising:
   a. a span for extending across said space and having an upper side for supporting traffic engageable therewith, said span having means at each of its opposite ends defining a transverse cylindrical recess with a downwardly directed rectangular slot; and
   b. a pair of feet each having lower side means for respectively engaging the two surfaces and each having a sloping upper side engageable with the traffic and extending from said upper side of said span toward said two surfaces, said feet each having a cylindrical portion pivotally trapped in one of the recesses and having an integral connection with each foot respectively at the lowermost part of said cylindrical portions and disposed in said downwardly directed rectangular slots, said integral connections and said downwardly directed rectangular slots being constructed to enable the sloping upper sides of said feet to pivot to both sides of the plane of said upper side of said span.

2. A portable ramp according to claim 1 which further includes:

a. a pair of convex cylindrical surface sections respectively integral with said first named means and disposed radially outwardly therefrom and concentric therewith; and b. a pair of concave cylindrical surface sections respectively integral with each of said feet and spaced radially outwardly and concentric with said cylindrical portion, there being an essentially constant gap between said concave and said convex surface sections terminating at an edge on the upper side of said foot, whereby there is a smooth transition between said upper side and said sloping upper sides for any angular position of either of said feet.

3. A portable ramp according to claim 1 in which at least one end of the upper side of said span merges into a further cylindrical surface radially spaced from and concentric with said cylindrical recess, the upper side of said foot extending essentially tangentially to said further cylindrical surface and terminating in an edge proximate thereto, whereby there is a smooth transition between said upper side and said sloping upper sides for any angular position of either of said feet.

4. A portable ramp according to claim 1 including four abutments respectively closing the ends of said cylindrical recesses and trapping said cylindrical portions therein.

5. A portable ramp according to claim 1 including a pair of upwardly extending elongated flanges disposed at opposite sides of said span.

6. A portable ramp according to claim 1 in which said span comprises:

a. a pair of spaced parallel side rails each having a cross-section which includes a C-shaped portion of uniform size opening toward the other side rail; and b. a pair of end members each defining a part of the upper side and each projecting laterally into said C-shaped portions, said cylindrical recesses being respectively disposed in said end members.

7. A portable ramp according to claim 6 including a number of filler members each projecting laterally into said C-shaped portions and disposed between said end members, and each defining a part of the upper side of the span.

8. A portable ramp according to claim 6 in which the cross-section of each of said side rails further includes an upward projection defining an elongated flange.

* * * * *